United States Patent [19]

Bertram et al.

[11] 4,047,671

[45] Sept. 13, 1977

[54] CONTINUOUSLY OPERABLE APPARATUS FOR THE PREPARATION AND/OR PROCESSING OF SYNTHETIC PLASTICS OR RUBBER MOULDING COMPOUNDS

[75] Inventors: Jurgen Bertram, Celle; Wilhelm Brand, Hannover; Hans-Joachim Schaeffer, Latzen, all of Germany

[73] Assignee: Hermann Berstorff Maschinenbau GmbH, Hannover-Kleefeld, Germany

[21] Appl. No.: 691,582

[22] Filed: June 1, 1976

[30] Foreign Application Priority Data

| May 30, 1975 | Germany | 2523932 |
| Mar. 25, 1976 | Germany | 2612610 |
| Mar. 25, 1976 | Germany | 2612611 |
| Mar. 25, 1976 | Germany | 2612612 |

[51] Int. Cl.² ........................................ B02C 11/08
[52] U.S. Cl. .................................... 241/66; 241/267; 259/102; 425/200
[58] Field of Search ............... 241/107, 111, 123, 267, 241/66; 259/102; 425/200, 202, 204, 205, 209

[56] References Cited

U.S. PATENT DOCUMENTS

| 135,556 | 2/1873 | Hudner et al. | 241/267 |
| 873,081 | 12/1907 | Philips | 241/267 |
| 1,626,535 | 4/1927 | Hush | 241/267 |
| 2,505,132 | 4/1950 | Meinhardt | 241/267 X |

*Primary Examiner*—Robert L. Spicer, Jr.
*Attorney, Agent, or Firm*—Donald D. Jeffery

[57] ABSTRACT

Continuously operable apparatus for the preparation and/or processing of synthetic plastics or rubber moulding compounds, comprising a housing in the form of a channel and a mixing and kneading member engaged in the channel and having a surface which cooperates with the bottom wall of the channel, in which said bottom wall and said surface of the mixing and kneading member are undulatingly profiled in a manner such that the profiles extend transversely or obliquely with respect to the longitudinal axis of said channel and said member, and drive means, including at least one crank drive, coupled between the housing and said member to cause said member and said housing, while retaining their respective orientations to move relatively to one another to cause the peaks of the undulations on one of said surface and said bottom wall to perform a circular movement in associated valleys in the other of said surface and said bottom wall.

Two synchronously movable crank drives may be provided with adjustment means for adjusting the spacing between the mixing and kneading member and the housing.

22 Claims, 16 Drawing Figures

CONTINUOUSLY OPERABLE APPARATUS FOR THE PREPARATION AND/OR PROCESSING OF SYNTHETIC PLASTICS OR RUBBER MOULDING COMPOUNDS

The invention relates to continuously operable apparatus for the preparation and/or processing of synthetic plastics or rubber moulding compounds.

Synthetic plastics material or rubber moulding compounds must not be thermally overloaded. A gentle processing or preparation is therefore needed but has not always been attainable with the hitherto-proposed plastics or rubber processing machines.

Where the preparation or processing of powdered synthetic plastics or rubber moulding are concerned, the intake of material presents considerable difficulties. Whenever powders are processed or prepared on screw machines, it is necessary to feed into an intake part a material which has a very low bulk weight. Screw machines only inadequately draw in a light powder resulting in an incomplete and uneven filling of the screwthread. As a result, the throughput is not pulse free and is substantially lower than is possible when processing or preparing granular moulding compounds. Furthermore by virtue of the difficulties of taking in the powder, the initial pressure needed to compress the moulding compound is only inadequately and inconstantly achieved. As a result, the extruded product has inclusions of gases and is not adequately platicised or homogenised.

The invention has among its objects to provide an apparatus of the kind described at the outset, which has satisfactory intake performance even with powdered synthetic plastics or rubber moulding compounds and which permits of careful preparation or processing of all moulding compounds.

According to the invention, there is provided continuously operable apparatus for the preparation and/or processing of synthetic plastics or rubber moulding compounds, comprising a housing in the form of a channel and a mixing and kneading member engaged in the channel and having a surface which cooperates with the bottom wall of the channel, in which said bottom wall and said surface of the mixing and kneading member are undulatingly profiled in a manner such that the profiles extend transversely or obliquely with respect to the longitudinal axis of said channel and said member, and drive means, including at least one crank drive, coupled between the housing and said member to cause said member and said housing, while retaining their respective orientations to move relatively to one another to cause the peaks of the undulations on one of said surface and said bottom wall to perform a circular movement in associated valleys in the other of said surface and said bottom wall.

Preferably the mixing and kneading member is movable and the housing is retained stationary.

The valleys in the bottom wall form, with the peaks on said member, chambers of variable volume. A peak on said member is in effect associated with a valley on the bottom wall. The moulding compound is constantly fed into the first valley, viewed in the direction of conveyance. The movement initiated by the crankdrive causes each peak on the member to displace moulding compound forwards in the direction of conveyance from the rearward part of the valley, so that an enlarging relaxation chamber and a diminishing compression chamber form in the valley in the bottom wall. Moulding compound is pushed into the next valley and is thereby subjected to a shearing action. If a jack is provided between the peak of said member and the valley of the bottom wall during the lowest position of the movable member, then according to the width of the gap between the wall and surface, a part of the moulding compound will be sealed off in the valley as a leakage flow. The process is repeated at every further circuit of the crank.

The fed-in moulding compound is drawn in positively and conveyed, since each valley of the bottom wall is at each rotation of the crank transversed by the effectively associated peak of the movable member and the moulding composition is displaced in the direction of conveyance. As this happens, the moulding compound is compressed, mixed and plasticised. The degree of homogenisation of the extruded product can be influenced by the number of successive valleys on the bottom wall and the corresponding number of peaks on the movable member.

It is possible with the apparatus according to the invention gently to process the moulding compound in terms of temperature loading, since following each compression phase, in each of the diminishing compression chambers, there is a relaxation of the moulding compound in the following expansion chamber.

Preferably the movable member is driven through two synchronously moving crank drives. The drive linkage thus has a greater stability. The movable member remains reliably in its predetermined angle of position in relation to the housing.

Advantageously the movable member is adjustable at right-angles to the housing i.e. towards and away from the housing. This adjustability permits variation of the shearing gap between the member and the bottom wall in order to set up the apparatus for different materials. This adjustability can be achieved for example by changing the crank radius or by varying the length of the push-rods.

Advantageously each of said surface and said bottom wall comprises a plurality of longitudinally extending profiled strips lying beside one another the profiling of the strips being staggered in relation to the neighbouring strip or strips. By this means, a satisfactory transverse mixing and protective processing of the moulding compound can be achieved.

Where a plurality of pairs of strips are provided, it is expedient to provide a separate crank drive for each movable strip. In this way, it is possible to choose the cycle of the movable strips on their circular paths differently with respect to one another and to vary them if necessary.

In order to achieve the different processing conditions for each plastics or rubber mixture, it is possible for the surfaces of the profiled member and bottom wall to be temperature-controlled.

Additional shearing energy can be applied to the moulding compound by providing the co-operating surfaces of the undulating profiles of the member and bottom wall with corrugations disposed obliquely with respect to the longitudinal axis. The transverse mixture is enhanced by alternating the inclination of the corrugations.

Advantageously the radius of each of the valleys and each of the peaks of the profile of said member are of equal magnitude, the distance between the geometric centre of each valley to the geometric centres of the next peak corresponds to twice said radius, the geometric centres of the valleys lie lower than the geometric centres of the peaks by a distance equal to half said radius, and the radius of each of the valleys of the profile of said surface is equal to the sum of said radius of the profile of said member and the radius of the or each crank drive.

The apparatus of the invention is particularly suitable for the preparation of moulding compounds for charging into calenders and extruders and can replace complicated mixing roll mechanisms or kneaders hitherto employed.

Improved in-feed of material can be obtained if the working face of the movable member and/or of the bottom wall, in the material in-feed end of the apparatus, is so extending away from the plane of the rest of the relevant working face that the result is an intake volume in the apparatus which becomes larger towards the in-feed end.

This construction means that it is possible to achieve a better degree of filling of the apparatus. Coarse moulding compounds with a high proportion of air can only be processed with a higher rate of throughput. The material fed in is continuously or intermittently comminuted and compressed to an ever-increasing extent and the air contained in the compound can escape.

A pivoting of the entire apparatus in such a way that the apparatus is tilted towards the discharge side can also favourably influence the intake of material.

As a development of the improved material intake, the working surface of the movable member can be constructed to extend obliquely upwardly at the material intake end of the apparatus. Viewed in the working direction, this produces a diminishing space to accommodate the moulding compound which is to be processed. The profiling of the movable strip becomes flatter towards the intake end.

The working surfaces of the movable member and of the bottom wall can be constructed so that they run out obliquely upwardly.

The angle of inclination of the oblique working face of the movable member is preferably chosen to be steeper than the angle of inclination of the bottom wall.

In a further development, the upwardly oblique working surface of the bottom wall is flat in the material intake end. In this way, large lumps of material can be satisfactorily gripped and steadily comminuted.

Advantageously, an infinitely variable adjustment of the intake volume which enlarges towards the material intake end is achieved in that the material intake end of the bottom wall is adjustably connected to the rest of the bottom wall through a ball joint. This possibility of adjustment can influence the intake behaviour of whichever moulding compound is being used.

By reason of the fact that the entire apparatus is tilted towards the material discharge end, the intake behaviour of the moulding compound can be adapted to variously constructed oblique intake portions. The apparatus can thereby be infinitely pivotable.

To obtain improved throughput, it is advantageous for the working face of the movable member and/or of the bottom wall, in the delivery end of the apparatus, so to extend away from the plane of whatever is the rest of the working face that the delivery volume of the apparatus becomes larger towards the discharge end.

The working faces are the facing profiled surfaces. By reason of the enlarging delivery volume, the resistance offered by the apparatus to the material being conveyed becomes less without impairing the satisfactory intake behaviour, particularly with respect to the powdered moulding compounds. Reduction of the resistance results in a higher throughput of the apparatus.

If desired the working face of the bottom wall, in the discharge end of the apparatus, can be constructed to extend obliquely downwardly. This creates, viewed in the direction of working, an enlarging space to receive the processed moulding compound.

The working face of the movable member and of the bottom wall in the discharge end of the apparatus can be constructed to extend obliquely downwardly. The angle of inclination of the oblique working face of the movable member is chosen to be flatter than the angle of inclination of the bottom wall.

If desired the downwardly angled working face of the bottom wall can be flat at the discharge end.

A continuous adjustment of the volume of the apparatus which becomes enlarged towards the discharge end is advantageously achieved in that the discharge end of the bottom wall is adjustably connected to the rest of the bottom wall through a ball joint. By reason of this possibility of adjustment, the resistance in the apparatus can be adjusted to whatever is the optimum for the moulding compound which it is required to process.

The working pressures in the apparatus can achieve considerable value in the lower eccentric zone of the crank drive. Since the apparatus is characterised by extremely good intake behaviour, then by reason of excessive in-feed of material, the pressure in the apparatus, in the lower eccentric zone, may become so great that the apparatus is damaged.

If the intake behaviour of the apparatus is not to lead to its being damaged, then it is advantageous for at least one of the co-operating movable member and bottom wall to be subjected to the loading of a pressure means against the direction of conveyance of the moulding compound and/or at right-angles to the direction of conveyance, i.e. towards the other one of the movable member and bottom wall, so that in the event of a predetermined pressure adjusted by means of the relevant pressure means being exceeded in the apparatus, the member or bottom wall which is subjected to such loading can be displaced against the said pressure loading.

If the working pressure in the apparatus exceeds the pressure exerted by the pressure means, the displaceable member or bottom wall which is subjected to the loading can escape the effect of the excessive working pressure. If the pressure peak in the apparatus is overcome and a normal working pressure is resumed, then the displaced member or bottom wall by reason of the pressure device which is applying a loading to it, resumes the predetermined position.

Preferably the bottom wall is subject to a loading by pressure means against the direction of conveyance of the moulding composition and when a predetermined pressure adjusted by means of the pressure device is exceeded in the apparatus, the bottom wall can move against the pressure loading.

Preferably the bottom wall is loaded at right-angles to the direction of conveyance of the moulding compound, by a pressure unit so that it is urged towards the movable member and can be displaced against the pressure loading.

In order to guarantee a reliable functioning of the safety arrangement, the bottom wall is loaded against the direction of conveyance of the moulding compound and at right-angles to the direction of the conveyance of the moulding compound towards the movable member by at least one pressure means and is displaceable against the pressure loadings.

If the working pressure in the apparatus exceeds the pressure exerted by the pressure means loading the bottom wall, then the bottom wall can move away in the direction of the pressure. If the pressure peak in the apparatus is surmounted and if the normal working pressure is resumed, the bottom wall will again be pushed back into the predetermined position by the pressure means loading it.

The pressure means loading the bottom wall may be a plate spring arrangement. However, it is alternatively possible for the pressure means to be hydraulic or pneumatic in construction.

The invention is diagrammatically illustrated by way of example in the accompanying drawings, in which.

Figure 1:
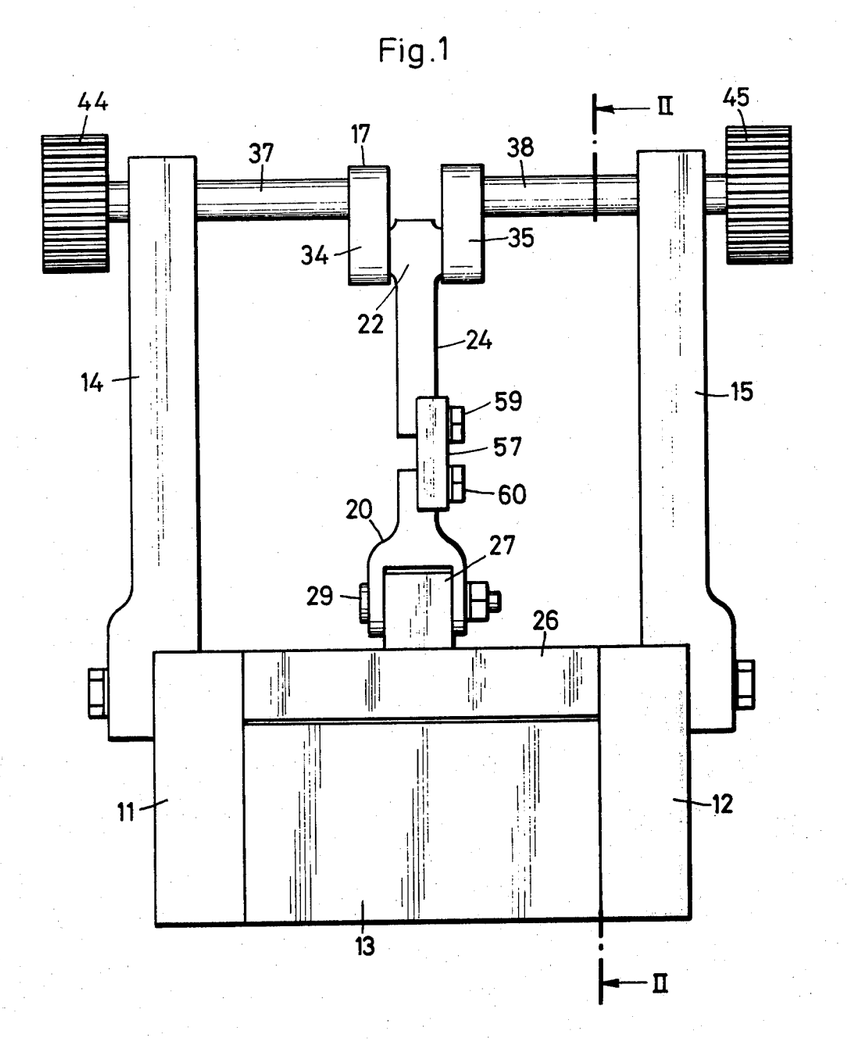
FIG. 1 shows apparatus according to the invention with an undulatingly profiled pair of strips.
Figure 2:
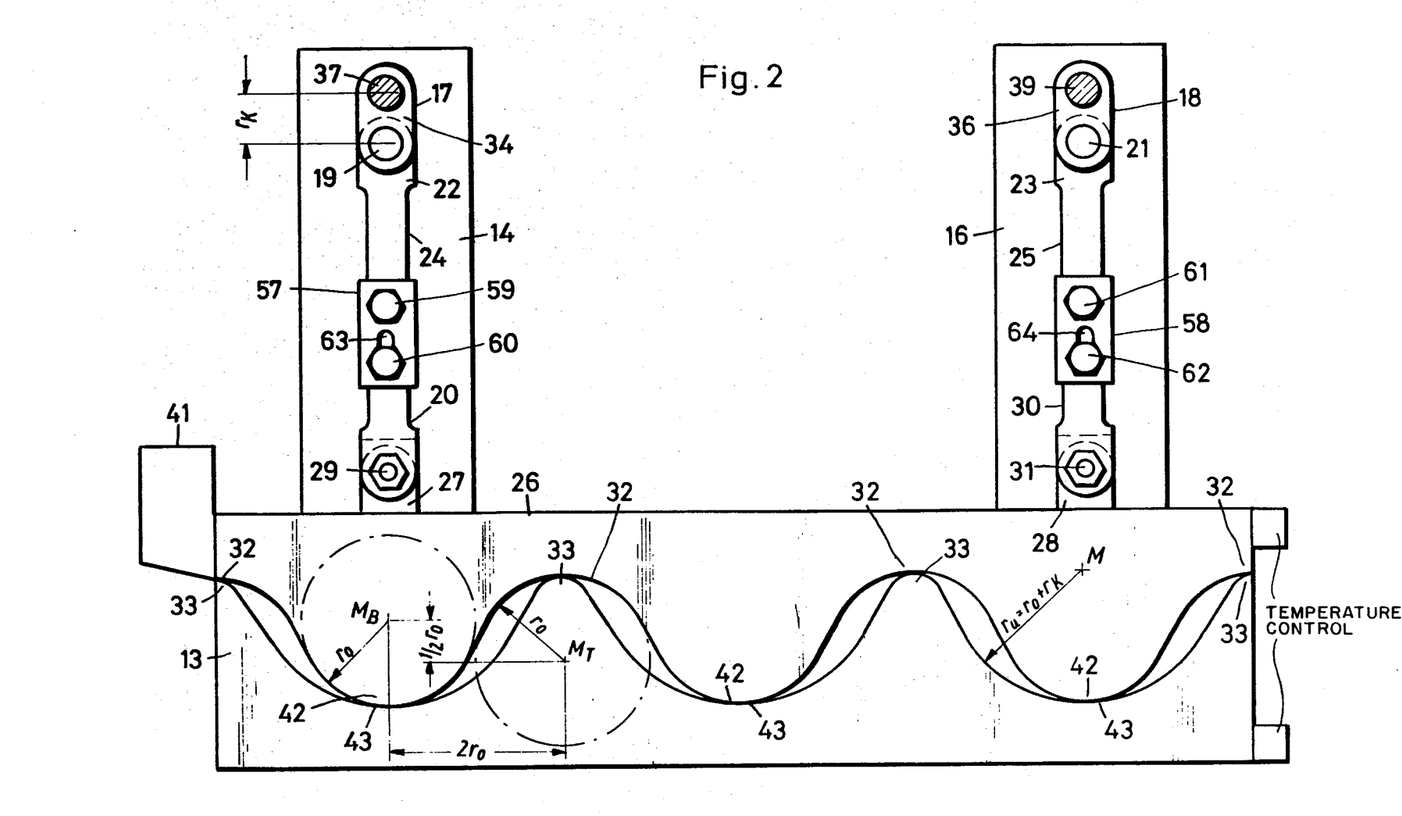
FIG. 2 is a side view of FIG. 1 taken on line II—II of FIG. 1.

Referring to the drawings, and firstly to FIGS. 1 and 2, the apparatus shown has two housing walls 11 and 12 between which there is a bottom wall 13 which, as can be seen in FIG. 2, is profiled along its upper side. On the housing wall 11 are a pair of supports 14 and 16 and on the housing wall 12 are a pair of similar supports of which only a support 15 is visible in the drawing, the supports on each wall being bolted rigidly in place and possibly connected to each other by suitable struts. Each support of each pair forms with a support of the other pair of mounting for a rotatably mounted crankshaft 17, 18. Rotatably fitted in a crankpin 19, 21 of each crankshaft 17, 18 is the crank-end head 22, 23 of a two-piece push-rod 24, 25. A bifurcated rod head 20, 30 of each push-rod 24, 25 engages around a bearing lug 27, 28 welded on a movable member 26 and is articulated rotatably thereon by a bolt 29, 31.

The two parts of each push-rod 24, 25 are rigidly bolted together by a connecting piece 57, 58 by means of screws 59, 60 or 61, 62. The screws 60, 62 which fit into the bottom half of the push-rod 24, 25 are inserted through an elongated hole 63, 64 in the connecting piece 57, 58. By means of this described connection, it is possible to adjust a definite gap between the bottom wall 13 and the movable member 26.

The underside of the movable member 26 is undulatingly profiled and lies between the housing walls 11 and 12 above the bottom wall 13, inverted valleys 32 in the profiled movable member 26 being opposite peaks 33 of the profiled bottom wall 13 and valleys 43 in the bottom wall 13 being opposite inverted peaks 42 in the movable members 26. In FIGS. 1 and 2, the movable member 26 is shown in its lowest position. Crank webs 34, 35, 36 are upright and the crankpins 19, 21 are below the shaft portions 37, 38 and 39 of the crankshafts 17, 18 which are mounted in the bearing supports 14, 15 and 16.

A material supply container 41, shown only in FIG. 2, is mounted at one end of the apparatus, on the housing walls 11 and 12 thereof and on the bottom wall 13.

Mounted at the ends of the shaft portions 37, 38, 39 are gearwheels 44, 45 by means of which the two crank shafts 17, 18 of the apparatus can be driven in synchronism by drive means (not shown).

The inverted valleys 32 and peaks 42 of the movable member 26 has the same radius $r_o$. The distance between centres from one valley 32 to the next peak 42 amounts to 2 $r_o$. The mid-points $M_T$ of the circle (shown by dash-dotted lines), on which each of the valleys 32 of the movable member 26 lie, are located ½ $r_o$ lower than the mid-points $M_B$ of the circles on which the peaks 42 lie. The transition between two adjacent circles is achieved by tangential connection.

The profiling of the bottom wall 13 has the same pitch as that of the movable member 26. The radius $r_u$ of the valleys 43 is the sum of the radius $r_o$ of the movable member 26 and the crank radius $r_K$. The smaller peaks 33 between the valleys 43 are suitably rounded off.

The mode of action of the arrangement will be explained in greater detail with reference to FIGS. 3 to 6. For the sake of simplicity, the apparatus is shown in FIGS. 3 to 6 with only one crank drive.

Figure 3:
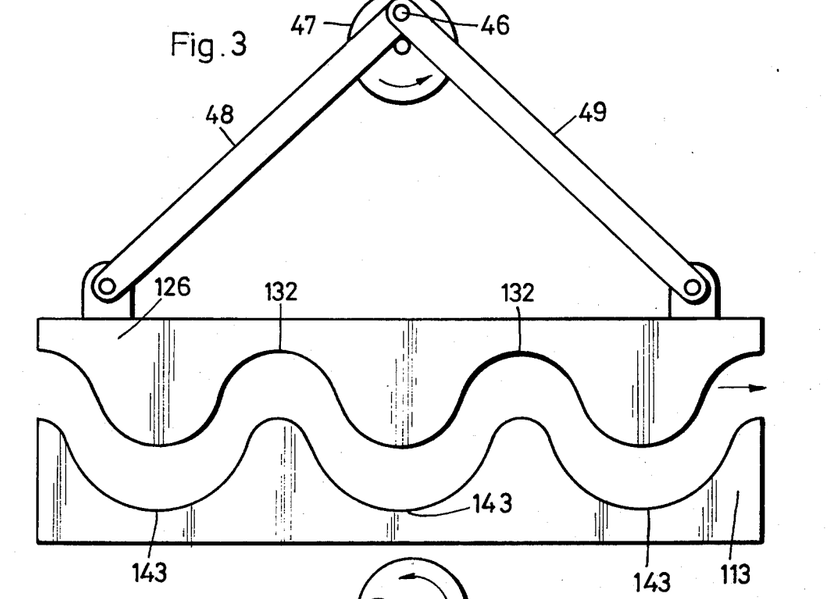
FIGS. 3 to 6 show schematically a movable member in four different positions which are traversed during one rotation of the crank in apparatus according to the invention.
Figure 4:
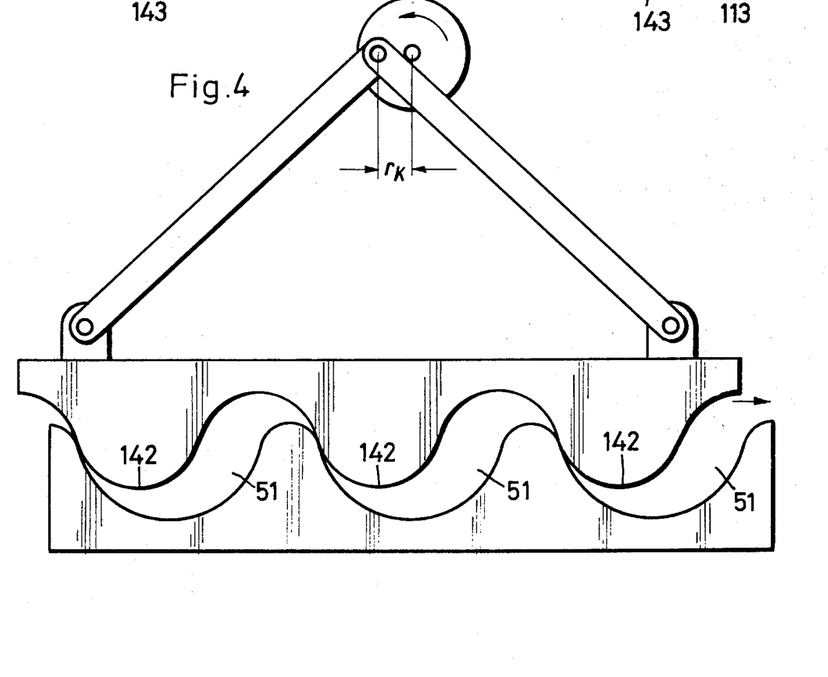
Figure 5:
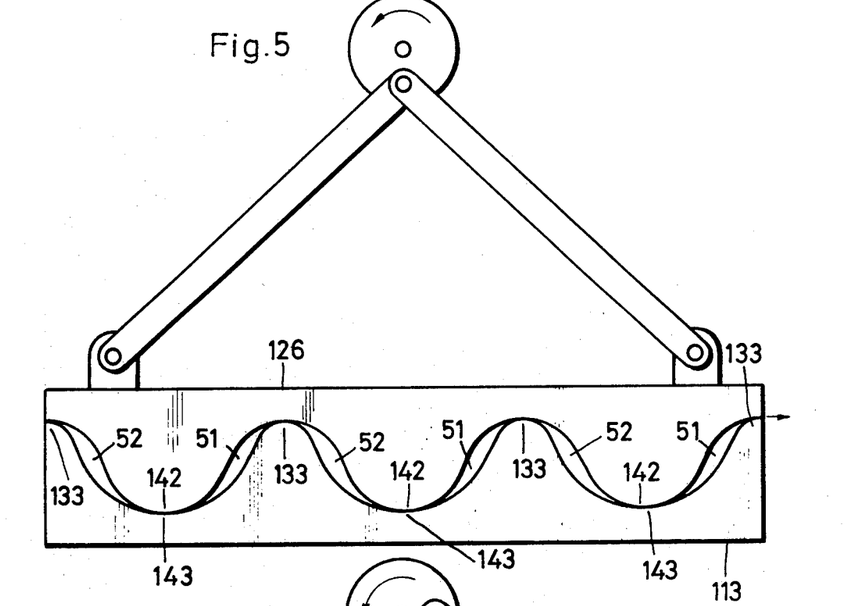

In the starting position of the apparatus shown in FIG. 3, a crankpin 46 has reached its highest point on a crank disc 47. A movable member 126 is lifted off a bottom wall 113 by push-rods 48 and 49. The, for example powdered, moulding material is fed into a first valley 43 of the bottom wall 113.

After a quarter of a rotation of the crank cam 47 (FIG. 4), the movable member 126 is in its outermost leftward position. The portions of the profiled flank of both the bottom wall 113 and the movable member 126 which are close to the ends lie upon one another. It is also possible so to adjust or construct the apparatus that there is always a gap between the two profiles. Compression chambers 51 are formed which become smaller in the course of further rotation of the crank disc 47 and the resultant positive movement of the crests 142 of the movable member 126 into the valleys 143 of the bottom wall 113. The movement of the crests 142 of the movable member 126 takes place on a circular path defined by the crank radius $r_K$. The moulding compound is conveyed towards and pressed against the side of each of the valleys 143 of the bottom wall 113 which is located downstream in the direction of conveyance (indicated by the arrow). Shearing energy is initiated into the moulding compound by the profile faces which are moved relatively to each other.

Figure 6:
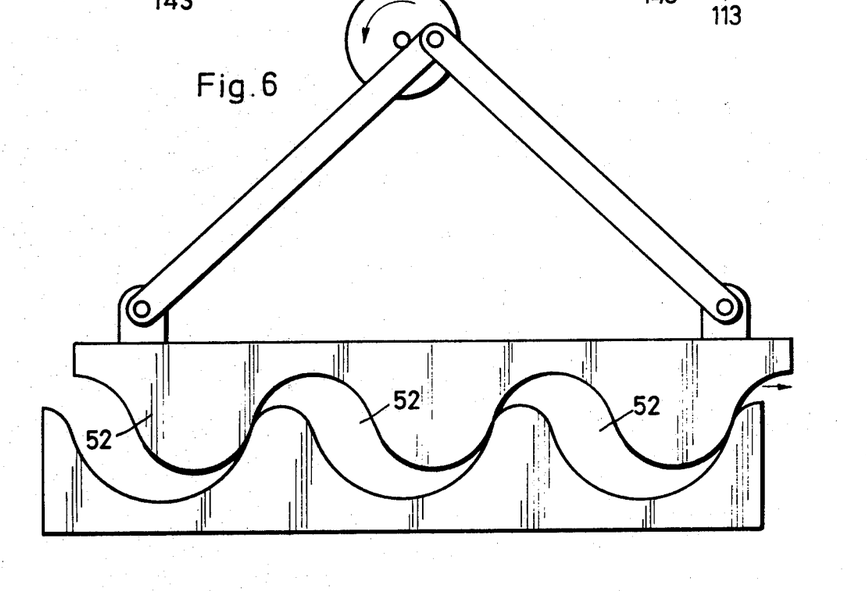

When the crankpin 46 reaches its lowest point (FIG. 5), the crests 142 of the movable member 126 protrude into the oppositely disposed valleys 143 of the bottom wall 113. The compression chambers 51 are of diminished volume; the compound is greatly compressed. As it moves further over the crests 133 of the bottom wall 113, moulding compound is transported through the gap between one valley 132 of the movable member 126 and the co-operating crest 133 of the bottom wall 113 into the next valley 143 of the bottom wall 113 and is thereby subjected to shearing stress. Larger expansion chambers 52 are created in the valleys 143, into which moulding compound from the preceding valley 143 is conveyed by the continuing movement of the movable member 126 (FIG. 6). This means that thoroughly mixed, kneaded and plasticised moulding compound, the homogeneity of which depends largely upon the number of compression chambers 51, is ejected from the last valley 143. Practical experiments with six compression chambers for the preparation of powdered rubber have produced a prepared moulding compound which, when processed on a screw extruder, yielded product of the very highest quality. To optimise the apparatus, the gap between the movable member and the bottom wall is variable.

At rotation of the crank cam 47, the moulding compound is intensively kneaded, compressed, mixed and plasticised in the valleys 143 of the bottom wall 113 and is also positively conveyed. The moulding compound is alternately compressed and decompressed. The result is that the moulding compound is relatively gently treated.

Figure 7:
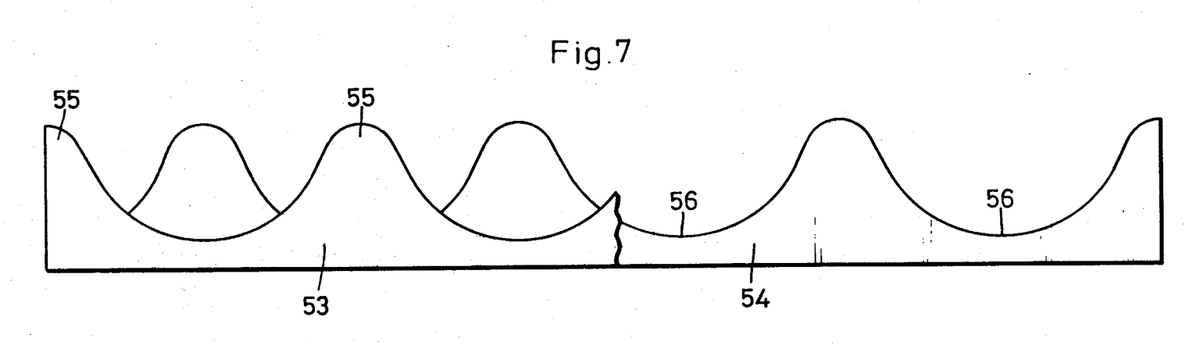
FIG. 7 shows the adjacently disposed strips of apparatus with two pairs of strips.

FIG. 7 diagrammatically shows an embodiment of a preparatory apparatus having two co-operating pairs of profiled strips in a housing channel. Only two fixed strips 53 and 54 of the pairs of strips are shown. The partially illustrated front strip 53 has its peaks 55 disposed alongside the valleys 56 of the other fixed strip 54. Transverse mixing of the moulding compound is enhanced by such an arrangement.

Figure 8:
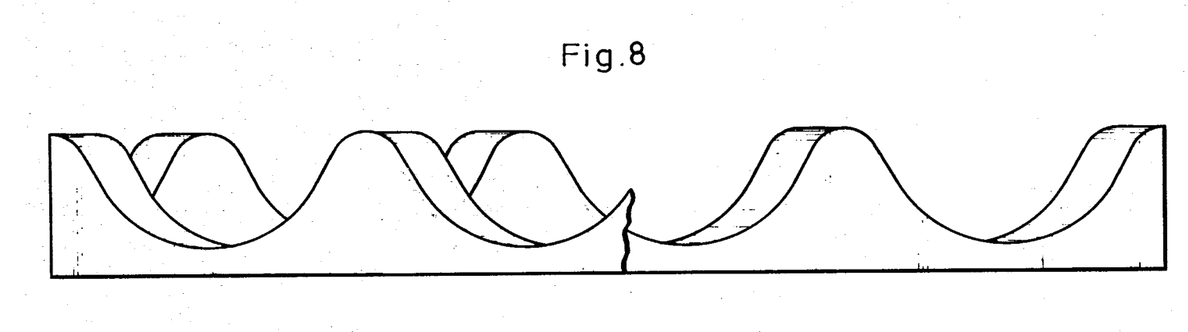
FIG. 8 shows the inclined profiling of two pairs of strips of which only the fixed strip is illustrated.

As shown in FIG. 8, a pair of fixed strips can have an opposite inclination of the profiling, this favours the transverse conveyance of the moulding compound.

Figure 9:
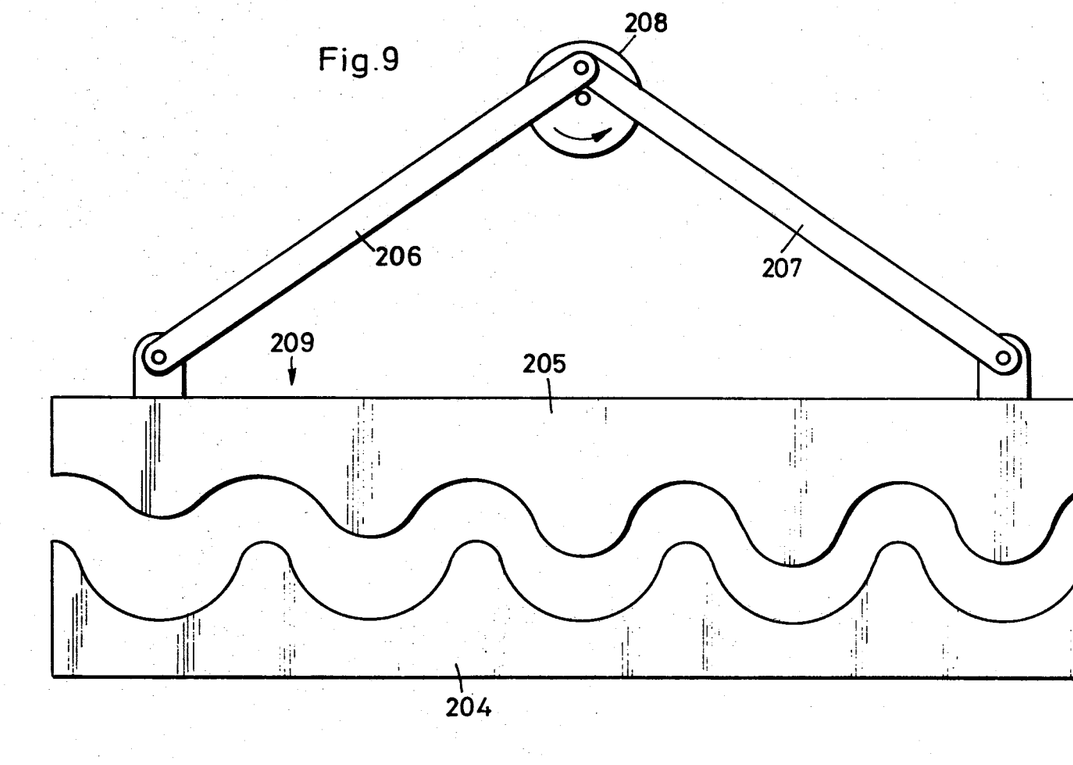
FIG. 9 shows apparatus with a crank drive in which a movable member is, in its intake portion, constructed to run out obliquely upwardly.

The apparatus shown in FIG. 9 has a bottom wall 204 with a continuous undulating profiling and a movable member 205 disposed above the bottom wall 204. On its face which is towards the bottom wall 204, the movable member 205 has a likewise continuous undulating profiling. The movable member 205 is driven through two push-rods 206, 207 by a crank drive 208 which, in the condition shown, is in its top dead-centre position.

The profiling of the movable member 205 at the material intake end 209 of the crank drive apparatus flattens out towards the material discharge side. The middle of the working face in the intake portion 209 of the movable member 205 extends obliquely upwardly. Since the undulating profiling of the bottom wall 204 remains continuously the same, the apparatus has in its intake zone 209 a larger capacity than in the rest of the apparatus.

Figure 10:
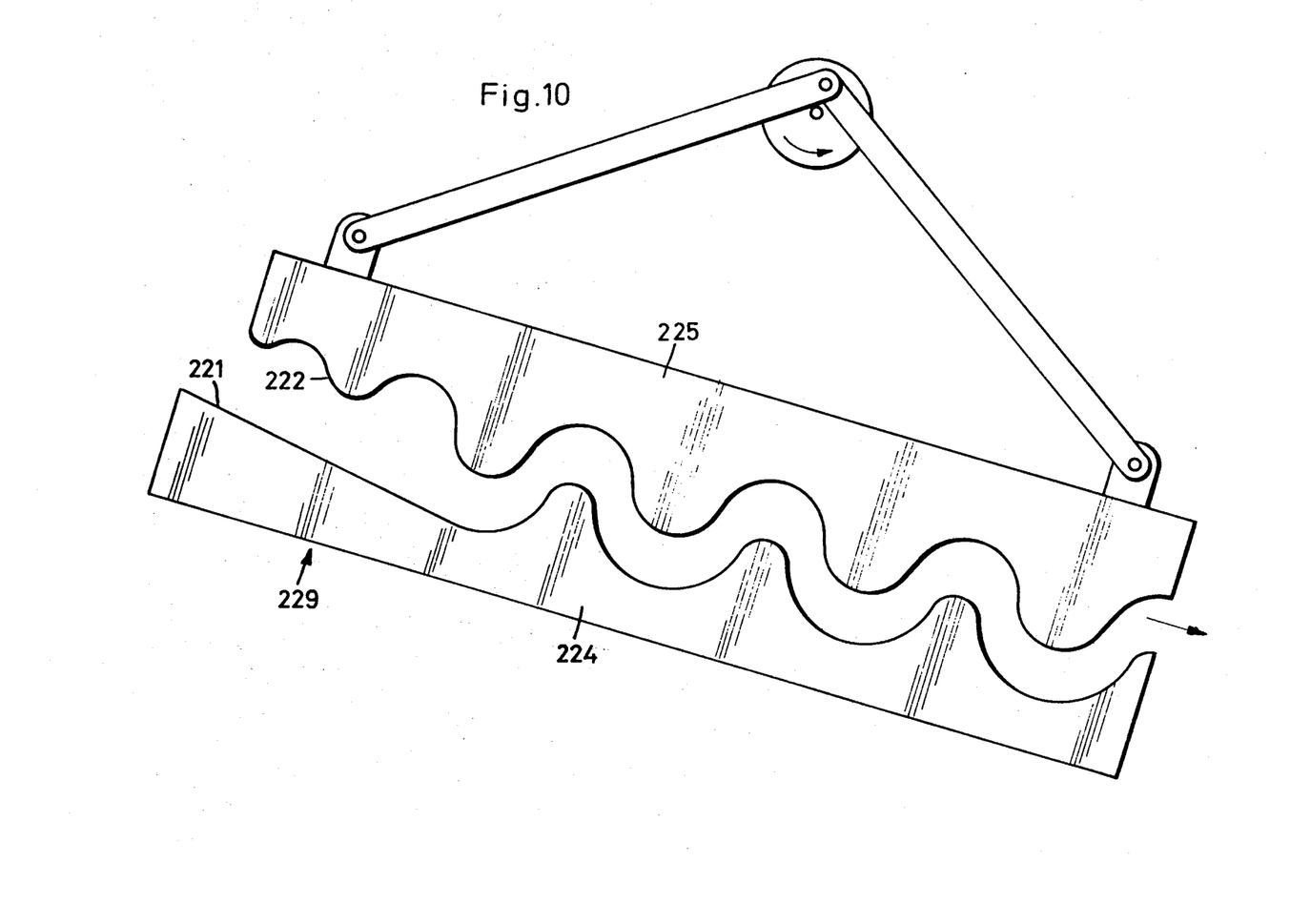
FIG. 10 shows apparatus which is inclined towards the material discharge side.

The apparatus shown in FIG. 10 is inclined downwardly towards the discharge end, which encourages the intake of material. In the intake portion 229 of the apparatus, the working faces of both the bottom wall 224 and the movable member 225 are constructed to extend obliquely upwardly. The working face 221 of the bottom wall 224 extends at a flatter angle than the oblique working face 22 of the movable member 115. The working face 221 of the bottom wall 224 is flat in the intake portion 229. The bottom wall 224 is longer than the movable member 225 and extends outwardly at the material intake end of the apparatus.

Figure 11:
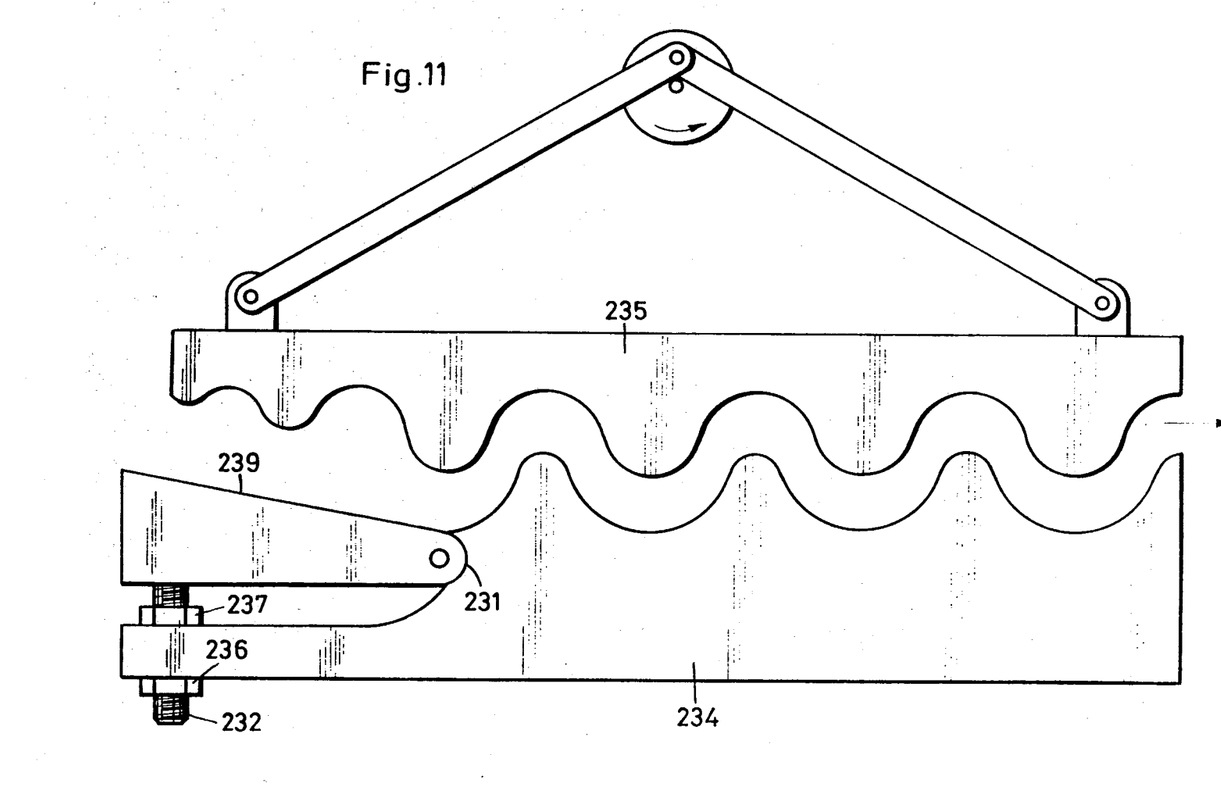
FIG. 11 shows a crank drive apparatus with an adjustable intake part of the fixed bottom wall.

FIG. 11 shows an embodiment of the invention in which an intake portion 239 of the bottom wall 224 is flat in construction. The flat intake portion 239 is adjustably connected via a ball joint 231 to the rest of the bottom wall 234. Adjustment of the inclination of the intake portion 239 can be effected by a screw spindle 232 guided in the bottom wall 234, and two lock nuts 236, 237.

Figure 12:
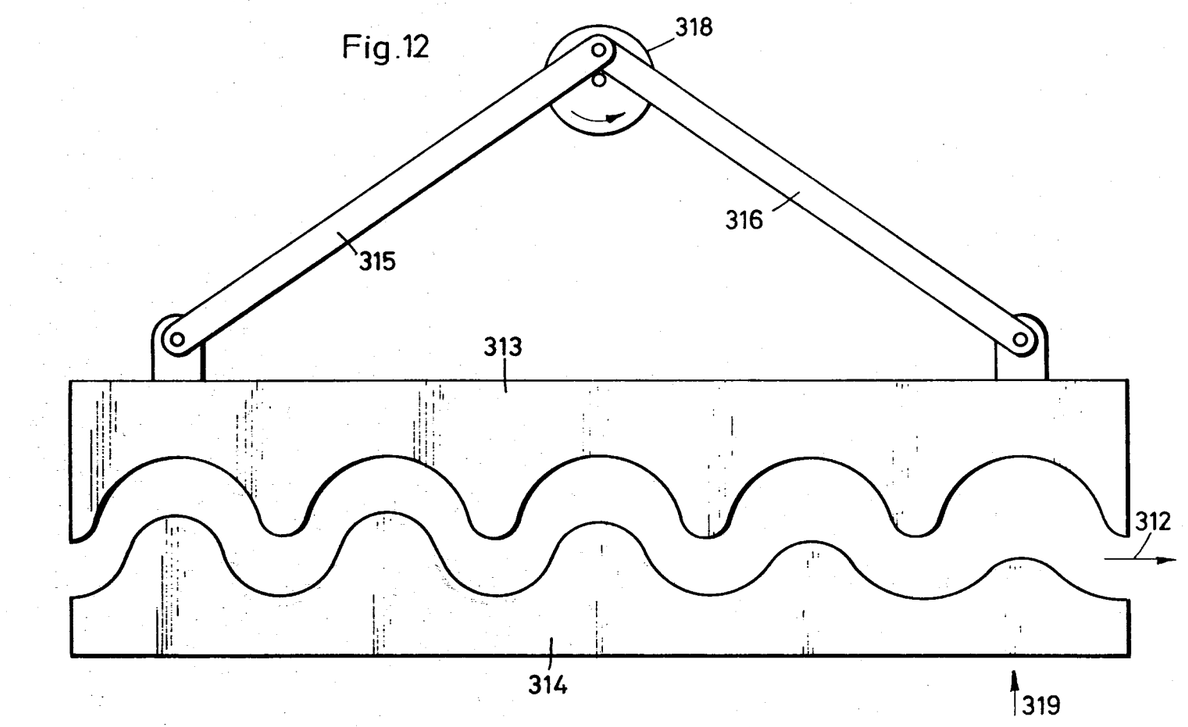
FIG. 12 shows apparatus with a crank drive with a bottom wall which, in its delivery end, is constructed to extend obliquely downwardly.

The embodiment shown in FIG. 12 has a bottom wall 314 with a continuous undulating profiling and a movable member 313 which is disposed above the bottom wall 314. Material is fed through the apparatus in a direction indicated by arrow 312. The movable member 313 has on its face which is towards the bottom wall 314, a likewise continuous undulating profiling. The movable member 313 is driven through two push-rods 315, 316 by a crank drive 318 which is shown in its top dead-centre position.

In a discharge end zone 319, the profiling of the bottom wall 314 flattens out towards the discharge end of the apparatus. The working face of the bottom wall 314 extends obliquely downwardly in the middle in the discharge end zone 319. Since the undulating profiling of the movable member 313 remains constantly the same, the apparatus has in its discharge end zone 319 a space for receiving processed moulding compound which becomes larger in the direction of conveyance.

Figure 13:
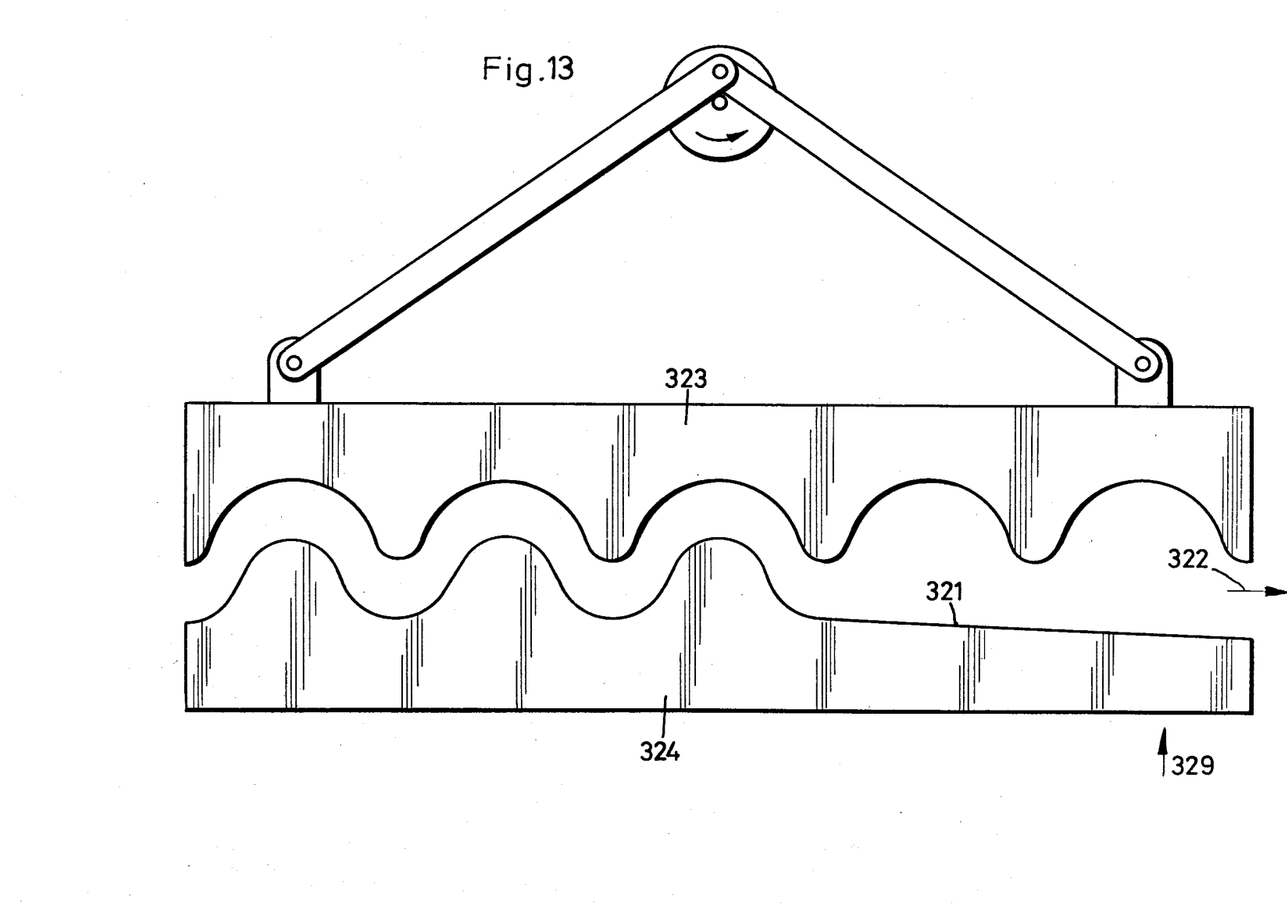
FIG. 13 shows apparatus wherein the downwardly obliquely set working face of the bottom wall is plane at the discharge end.

In the apparatus shown in FIG. 13, a working 321 of a bottom wall 324 which extends obliquely downwardly in a discharge end zone 329 is of flat construction. The material conveyed through the apparatus in the direction indicated by arrow 322 encounters in the discharge end zone 329 a constantly diminishing resistance from the apparatus.

It is also possible to construct the co-operating working faces so that they extend obliquely upwardly in the discharge end zone of the apparatus. The oblique working face of the bottom wall must thereby extend at a flatter angle than the oblique working face of th movable member.

Figure 14:
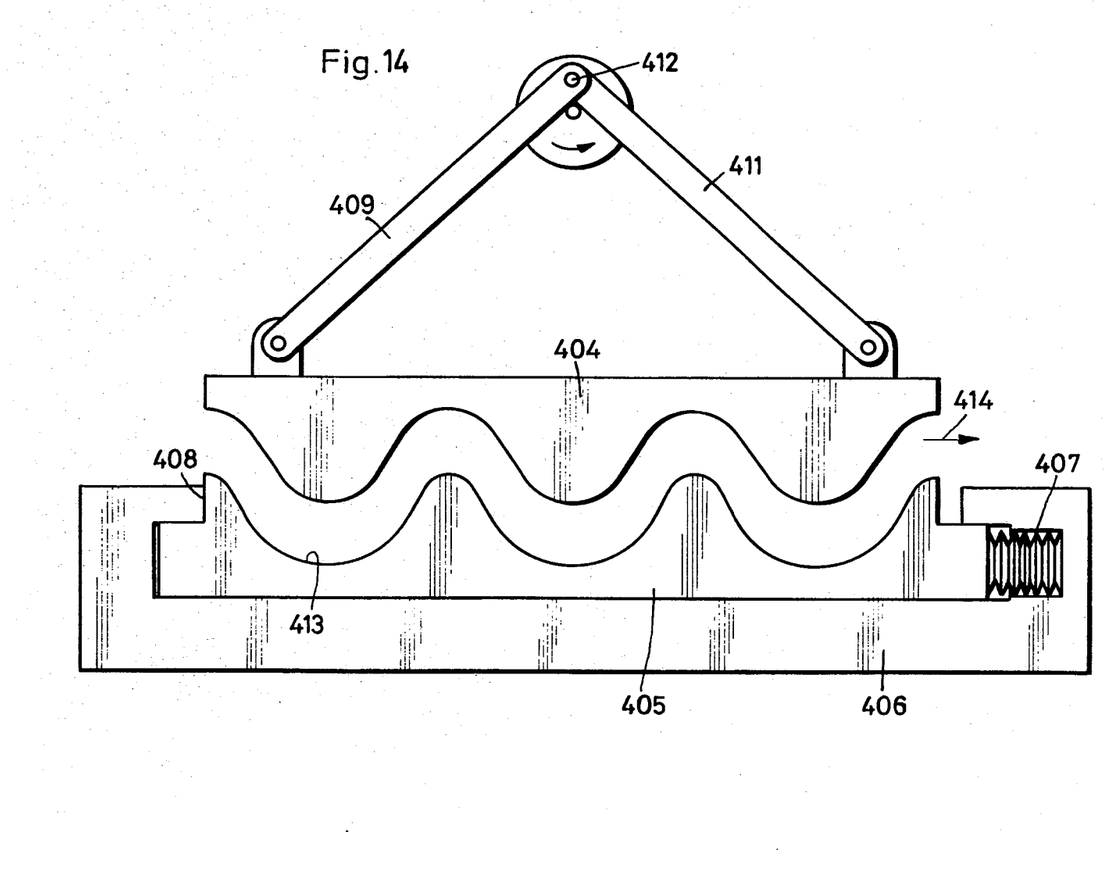
FIG. 14 shows apparatus in its top dead-centre position with a pressure means for loading the bottom wall against the direction of conveyance.

The apparatus shown in FIG. 14 has a pair of co-operating members 404 and 405 with superposed working faces. The surfaces are undulatingly profiled. The bottom wall 405 is rigidly disposed in a guide bed 406 and is biased against a stop 408 by a plate assembly 407.

The movable member 404 is lifted off the fixed i.e. not driven, bottom wall 405 through push-rods 409 and 411 by a crankpin 412 which is shown in its top dead-centre position.

Moulding compound fed into a first valley 413 is conveyed through the apparatus in the direction of the arrow 414. If the working pressure in the apparatus becomes too great, the bottom wall 405 can move in the direction of conveyance against the pressure loading of the plate spring assembly 40. Once the pressure peak has abated, the plate spring assembly 407 pushes the bottom wall 405 back into the predetermined position against the stop 408.

Figure 15:
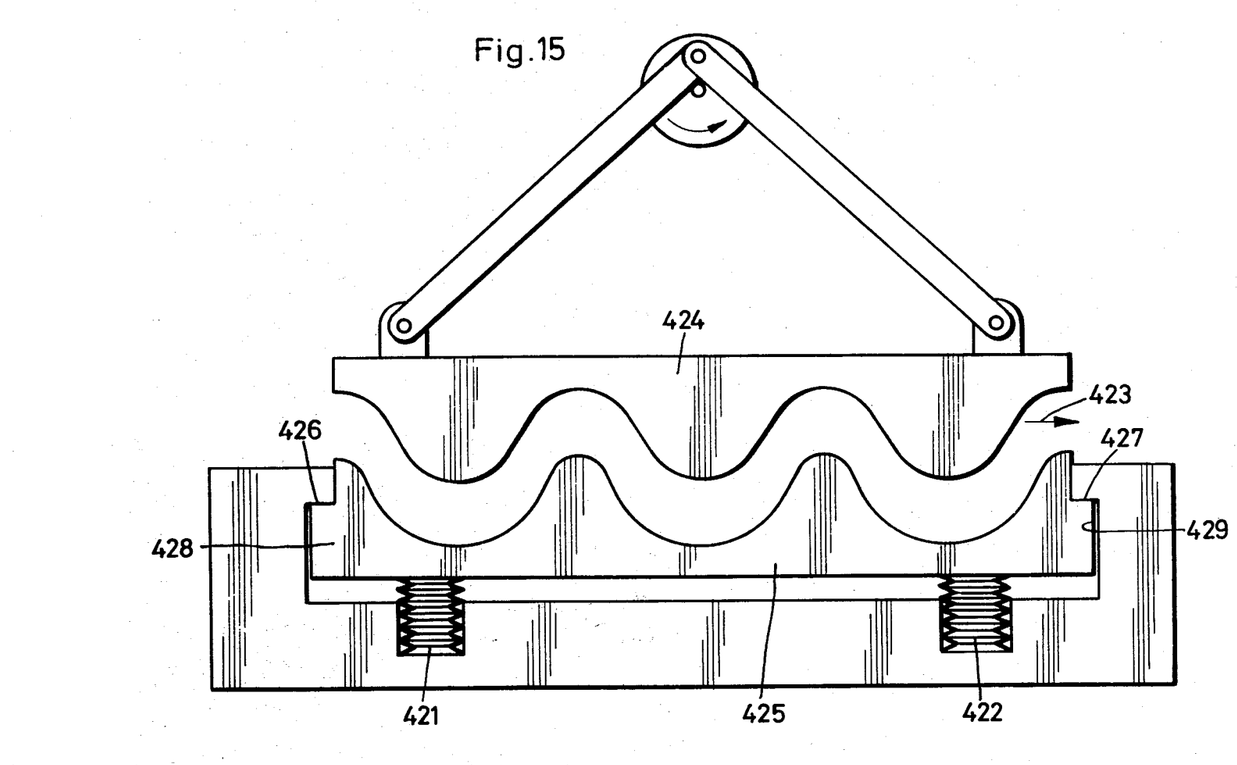
FIG. 15 shows apparatus having a pressure means loading the bottom wall at right-angles to the direction of conveyance and towards the movable member.

The apparatus according to FIG. 15 has a safety means comprising two plate spring assemblies 421 and 422. The plate spring assemblies 421 and 422 load a fixed, i.e. not driven, bottom wall 425 at right-angles to the direction of conveyance (arrow 423) in the direction of the movable member 424 against stops 426 and 427 which co-operate with stops 428, 429 on the bottom wall 425.

In the event of an inadmissible working pressure rise, the bottom wall 425 moves downwardly. When the pressure peak is passed the plate spring assemblies 421, 422 push the bottom wall 425 back into the predetermined position against the stops 426, 427.

Figure 16:
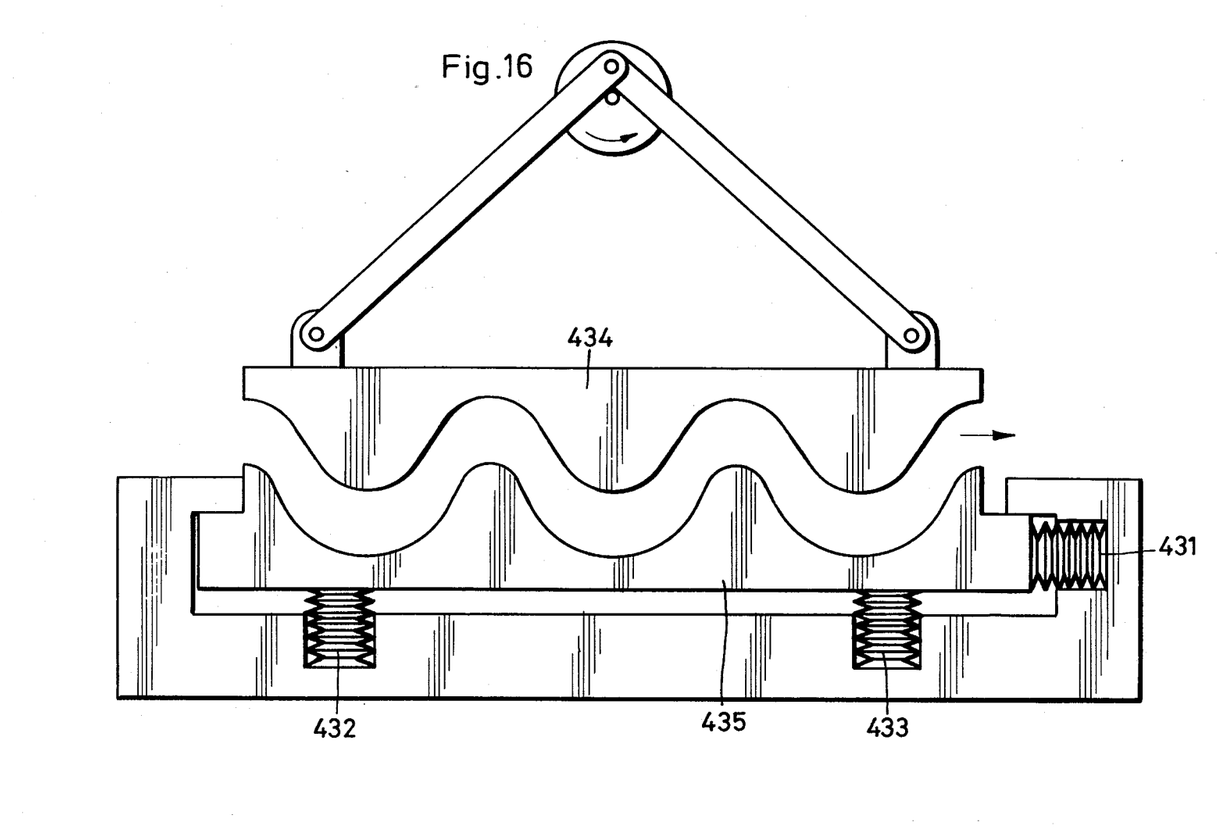
FIG. 16 shows apparatus with a combined safety means comprising a pressure means acting against the direction of conveyance and a pressure means acting against the movable member at right-angles to the direction of conveyance.

The apparatus shown in FIG. 16 has the safety means shown in FIG. 14 and in FIG. 15. By reason of the provision of a plate spring assembly 431 which biases a fixed i.e. not driven, bottom wall 435 against the direction of conveyance, and plate spring assemblies 432, 433, which load the bottom wall 435 at right-angles against the movable member 434, the bottom wall 435 can move in the resultant direction of thrust in the event of an inadmissible increase in the working pressure in the apparatus. When the pressure peak has passed and normal working pressure has been restored in the apparatus, the bottom wall 435 is pushed back into its predetermined position.

What is claimed is:

1. In continuously operable apparatus for the processing of powdered moulding compounds, the improvement comprising a housing in the form of a channel and a mixing and kneading member engaged in the channel and having a surface which co-operates with the bottom wall of the channel, in which said bottom wall and said surface of the mixing and kneading member are undulatingly profiled in a manner such that the profiles extend transversely or obliquely with respect to the longitudinal axis of said channel and said member, and drive means, including at least one crank drive, coupled between the housing and said member to cause said member and said housing, while retaining their respective orientations to move relatively to one another to cause the peaks of the undulations on one of the profiled surface and the profiled bottom wall to perform a circular movement in associated valleys in the other of the profiled surface and the profiled bottom wall, whereby the moulding compounds are sheared in said valleys and longitudinally conveyed from valley to valley to a discharge end of the apparatus.

2. The invention of claim 1, wherein said drive means comprises two synchronously movable crank drives which together move one of said housing and said member.

3. The invention of claim 1, wherein the movable one of said housing and said member is adjustable in position toward and away from the other of said housing and said member.

4. The invention of claim 1, in which each of said surface and said bottom wall comprises a plurality of longitudinally extending profiled strips lying beside one another, the profiling of the strips being staggered in relation to the neighbouring strip or strips.

5. The invention of claim 4, in which a separate crank drive is provided for each movable strip.

6. The invention of claim 1, including means provided for controlling the temperature of on or both of said member and said bottom wall.

7. The invention of claim 1, wherein the profiles of said surface and said bottom wall comprise corrugations disposed transversely or obliquely with respect to their longitudinal extent.

8. The invention of claim 1, wherein the radius of each of the valleys and each of the peaks of the profile of said member are of equal magnitude, the distance between the geometric centre of each valley to the geometric centre of the next peak corresponds to twice said radius, the geometric centres of the valleys lie lower, than the geometric centres of the peaks by a distance equal to half said radius, and the radius of each of the valleys of the profile of said surface is equal to the sum of said radius of the profile of said member and the radius of the crank drive.

9. The invention of claim 1, wherein at least one of said surface of said member and said bottom wall of said housing in a material intake end zone of the apparatus extends in such a way away from the plane of the cooperating surface or wall that the receiving space in the apparatus increases towards said intake end zone.

10. The invention of claim 9, wherein said surface of said member in said material intake end zone extends obliquely upwardly.

11. The invention of claim 10, wherein said surface of said member and said bottom wall are, in the intake end zone, constructed to run out obliquely upwardly and said bottom wall extends at a flatter angle than the oblique surface of said member.

12. The invention of claim 11, wherein said bottom wall is constructed flat on its oblique intake end zone.

13. The invention of claim 9, wherein the portion of the bottom wall in said intake zone end is adjustably connected through a ball joint to remainder of the housing.

14. The invention of claim 1, wherein said apparatus is mounted to be inclined downwardly towards the material in-feed end.

15. The invention of claim 1, wherein the housing defining said bottom wall is longer than said member and projects beyond said member at the material in-feed end.

16. The invention of claim 1, wherein said surface of said member and said bottom wall diverge in the material discharge end zone of the apparatus so that the discharge volume of the apparatus become larger towards the discharge end.

17. The invention of claim 16, wherein said bottom wall is in the discharge end zone of the apparatus constructed to extend obliquely downwardly.

18. The invention of claim 16, wherein saaid surface and said bottom wall are in the discharge end zone of the apparatus both constructed to run out obliquely downwardly.

19. The invention of claim 17, wherein said downwardly angled bottom wall is plane in the discharge end zone.

20. The invention of claim 16, wherein a portion of said housing forming said bottom wall is, in the discharge end zone, adjustably connected through a ball joint to the remainder of the housing.

21. The invention of claim 1, wherein a portion of said housing forming said bottom wall is loaded against the direction of conveyance of the moulding compound and at right-angles to the direction of conveyance, towards said member by pressure means and in the event of a determined pressure being exceeded in the apparatus, said portion of said housing can be displaced against the loading with respect to the remainder of said housing.

22. The invention of claim 21, wherein said portion of said housing is loaded against the direction of conveyance of the moulding compound and at right-angles to the direction of conveyance of the moulding compound, towards said member by in each case a plate spring arrangement and is displaceable against the pressure loading.

* * * * *